(12) United States Patent
Hada et al.

(10) Patent No.: US 7,171,937 B2
(45) Date of Patent: Feb. 6, 2007

(54) OIL PAN FOR INTERNAL COMBUSTION ENGINE

(75) Inventors: Masatoshi Hada, Nagoya (JP); Yasuki Ohta, Nagoya (JP)

(73) Assignee: Aichi Machine Industry Co., Ltd., Nagoya (JP)

( * ) Notice: Subject to any disclaimer, the term of this patent is extended or adjusted under 35 U.S.C. 154(b) by 0 days.

(21) Appl. No.: 11/134,260

(22) Filed: May 23, 2005

(65) Prior Publication Data

US 2005/0279314 A1 Dec. 22, 2005

(30) Foreign Application Priority Data

Jun. 18, 2004 (JP) ............................. 2004-181876

(51) Int. Cl.
*F02B 75/06* (2006.01)
(52) U.S. Cl. ............................. 123/195 C; 123/196 R
(58) Field of Classification Search ............ 123/195 C, 123/196 R, 198 E, 192.1; 184/106
See application file for complete search history.

(56) References Cited

U.S. PATENT DOCUMENTS 5,653,205 A * 8/1997 Ozeki .................... 123/195 C

FOREIGN PATENT DOCUMENTS

JP 3-52312 U 5/1991

* cited by examiner

*Primary Examiner*—Stephen K. Cronin
*Assistant Examiner*—Hyder Ali
(74) *Attorney, Agent, or Firm*—Dennison, Schultz & MacDonald

(57) ABSTRACT

An oil pan for internal combustion engine which is lightweight and has improved stiffness and vibration suppression, achieved by reducing the number of components. The oil pan includes an upper portion to be attached to the bottom portion of a cylinder block directly or through an adaptor plate and a lower portion provided on the bottom of the upper portion, with a baffle plate formed integrally downward of the upper portion. An oil supplying means which sucks the oil accumulated in the lower portion and supplies the sucked oil to portions of the internal combustion engine is provided.

5 Claims, 3 Drawing Sheets

OIL PAN FOR INTERNAL COMBUSTION ENGINE

BACKGROUND OF THE INVENTION

1. Field of the Invention

The present invention relates to an oil pan for internal combustion engine.

2. Description of the Related Art

As an oil pan provided on the bottom portion of an internal combustion engine, an oil pan including a baffle plate having a guide face inclined downward from its central portion toward its peripheral portion and a plurality of oil discharge holes formed in the outer peripheral portion of this guide face intermittently at positions in contact with the inner peripheral face of the oil pan, this baffle plate being located above an oil sump formed by deep-drawing the bottom portion of the oil pan main body for collecting oil, has been proposed conventionally.

In the oil pan having the baffle plate as disclosed in conventional patent document 1, returned oil which after lubricating sliding faces of an internal combustion engine, that is, sliding faces of a cylinder and piston and bearing portions of a crank shaft and the like, floats in space of a crank case and drops down is received by a baffle plate and returned to an oil sump through the guide face, oil discharge holes and then the internal peripheral face of an oil pan main body in this order. Thus, an impact generated when the returned oil drops to oil in the oil sump is small thereby preventing bubbles from being generated in oil of the oil sump.

Patent document 1: Japanese Utility Model Application Laid-Open No.HEI3-52312

Generally, the baffle plate attached to the bottom end of the cylinder block or above the oil pan has a function of a structural component which suppresses vibration and the like generated in the opening direction of the cylinder block. However, because in the aforementioned conventional oil pan, the baffle plate is attached above the oil pan main body as a separate member and it is formed only partially above the oil pan, it cannot be said that it exerts the function for suppressing vibration sufficiently.

The present invention has been accomplished to improve the vibration suppressing effect of the internal combustion engine. According to a first aspect of the present invention, there is provided an oil pan for internal combustion engine comprising an upper portion to be attached to the bottom portion of a cylinder block directly or through an adaptor plate and a lower portion provided on the bottom of the upper portion, in which a baffle plate is formed integrally downward of the upper portion and an oil supplying means for supplying sucked oil to respective portions of the internal combustion engine is provided, wherein the upper portion is constituted of side walls connecting the cylinder block with the lower portion and the baffle plate, the baffle plate is comprised of the sucking portion which is the oil supplying means provided substantially in the center and an inclined portion which is inclined downward toward the side wall with the sucking portion as its vertex and communicating opening portions are formed near the side walls of the inclined portion to communicate the cylinder block with the lower portion.

According to a second aspect of the present invention, preferably, a plurality of tightening holes for fastening the oil pan to a cylinder block with tightening means are provided in the top portion of the side wall of the upper portion, the tightening holes are located between respective cylinders along the arrangement direction of the cylinders formed in the cylinder block, longitudinal ribs are formed vertically at positions corresponding to the positions of the tightening holes on the inner side of the side wall while the longitudinal ribs are inclined from the top end of the side wall to said baffle plate.

According to a third aspect of the present invention, preferably, the communicating opening portions are provided between the longitudinal ribs in the arrangement direction of the cylinders and on both ends in a direction perpendicular to the arrangement direction of the cylinders.

According to a fourth aspect of the present invention, preferably, an oil passage for introducing oil sucked by a sucking portion of the baffle plate into the oil supplying means is formed integrally in the bottom of the upper portion.

The oil pan for the internal combustion engine of the present invention comprises the upper portion and the lower portion provided on the bottom of the upper portion and the baffle plate is formed integrally on the bottom of the upper portion and an oil supplying means is provided. The upper portion is comprised of side walls connecting a cylinder block with the lower portion and the baffle plate. The baffle plate is comprised of a sucking portion in the oil supplying means provided substantially in the center and the inclined portion which is inclined downward toward the side walls with the sucking portion as its vertex. The communicating opening portions for communicating the cylinder block with the lower portion are formed near the side walls of the inclined portion. Thus, because the baffle plate is formed integrally with the bottom of the upper portion, as compared with a case where the baffle plate is provided with a separate member, higher stiffness can be secured so that vibration and radiating sound can be suppressed more easily, thereby the quantity of components being reduced and the weight of the internal combustion engine being reduced.

The top portion of the side wall of the upper portion includes a plurality of tightening holes for fastening the oil pan to the cylinder block with tightening means. The tightening holes are provided so as to be located between respective cylinders in the arrangement direction of the cylinders formed in a cylinder block and the longitudinal ribs are formed vertically on the inner side of the side walls at positions corresponding to the positions of the tightening holes. The longitudinal ribs are formed in such a shape in which it is inclined from the top end of the side wall to the baffle plate. Consequently, the longitudinal ribs connect the side walls with the baffle plate thereby intensifying the stiffness of the baffle plate.

Because the communicating opening portions are provided between the respective longitudinal ribs in the arrangement direction of the cylinders and on both ends in the direction at right angle to the arrangement direction of the cylinders, oil dropping onto the baffle plate can be introduced from the right/left sides and front/rear sides of the outer periphery of the baffle plate to the lower portion located downward quickly under a guide of the longitudinal ribs, and consequently, heat of hot oil is discharged to the atmosphere through the side face and bottom face of the lower portion so that oil is cooled excellently.

Because the oil passage for introducing oil sucked through the sucking portion of the baffle plate to the oil supplying means is formed integrally on the bottom of the upper portion, oil can be supplied excellently to the oil supplying means through the oil passage and further, because the oil passage is formed integrally, the stiffness of the baffle plate is improved thereby the vibration suppressing effect of the internal combustion engine being improved.

DESCRIPTION OF THE PREFERRED EMBODIMENTS

Hereinafter the preferred embodiment of the present invention will be described with reference to the accompanying drawings.

Figure 1:
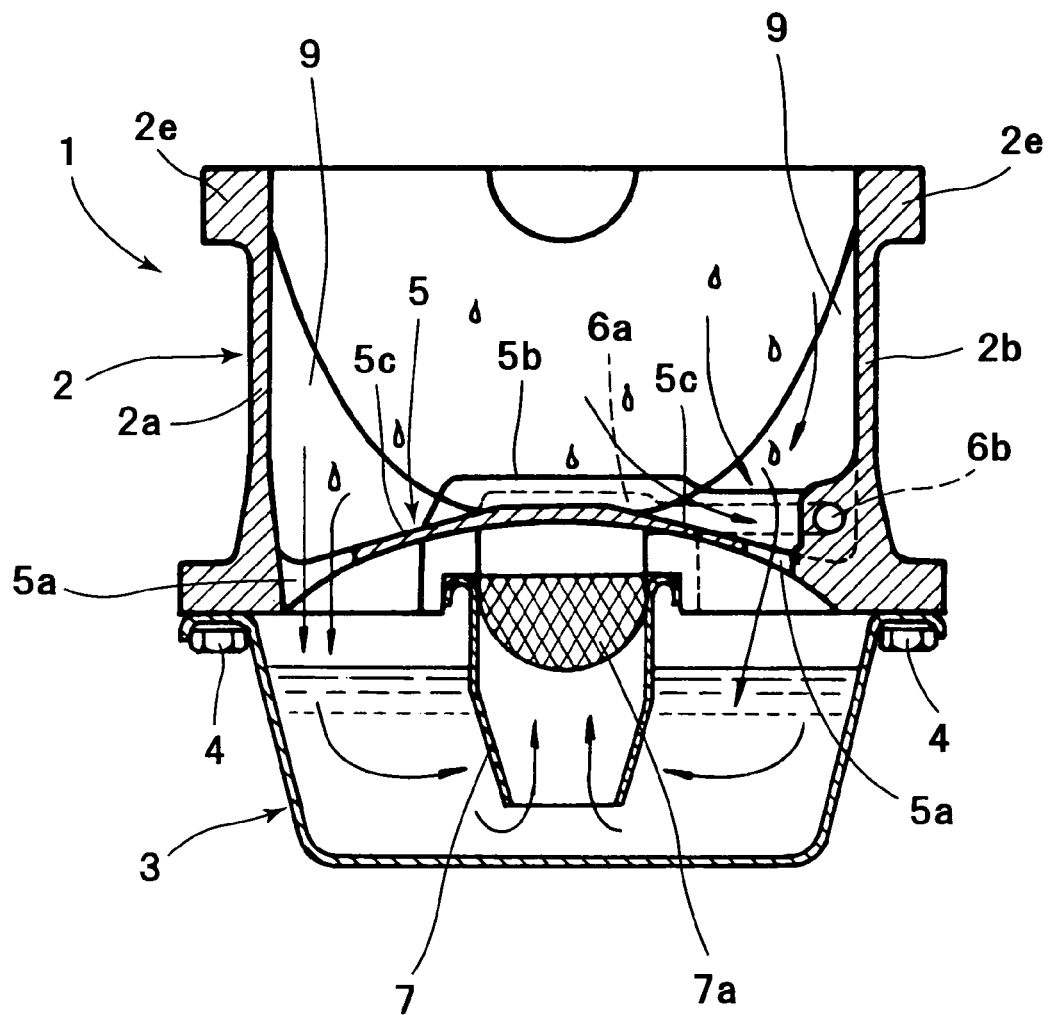
FIG. 1 is a front longitudinal sectional view of an oil pan.
Figure 2:
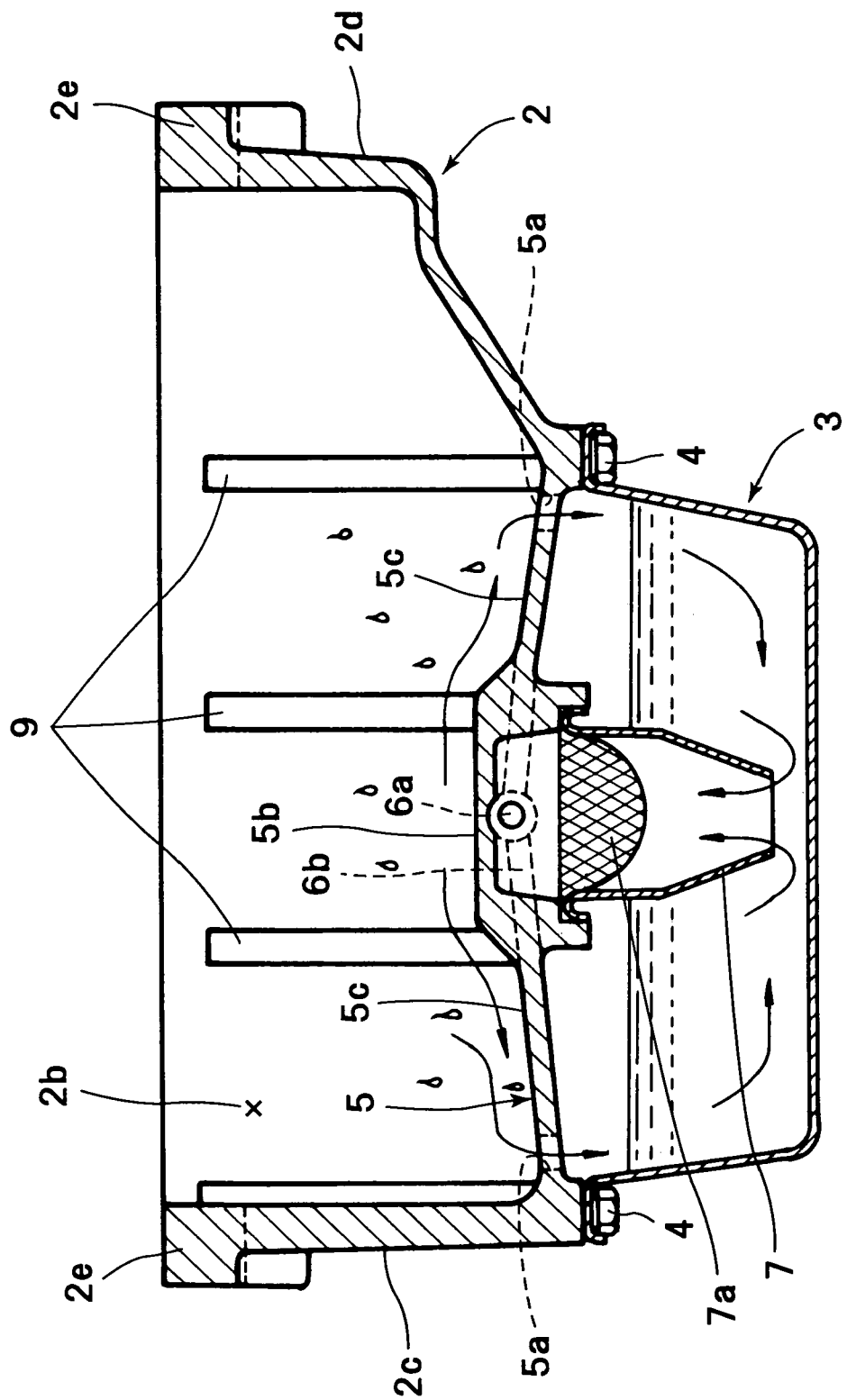
FIG. 2 is a side longitudinal sectional view of the oil pan.
Figure 3:
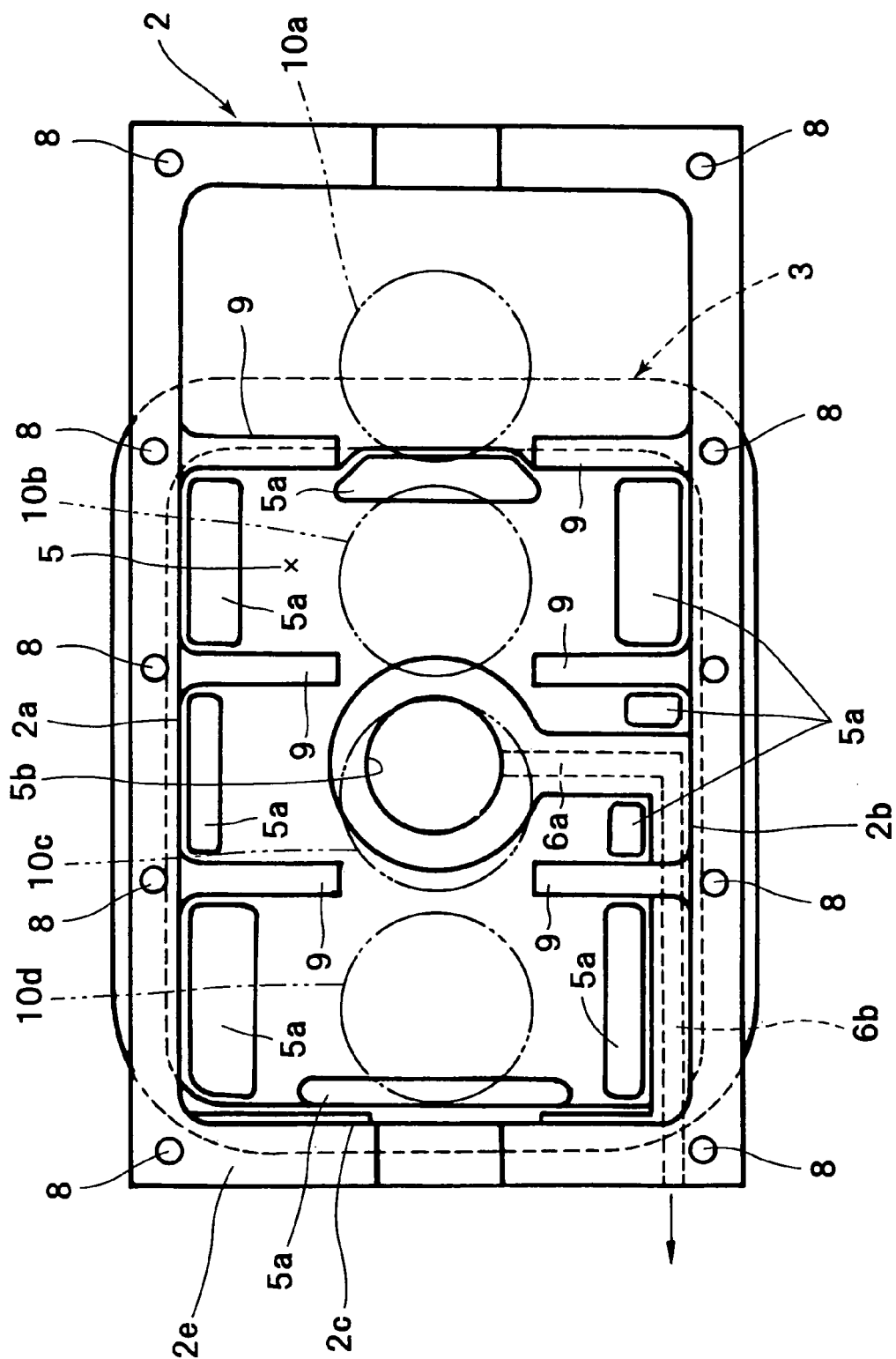
FIG. 3 is a plan view of the oil pan.

FIG. 1 is a front longitudinal sectional view of an oil pan of an internal combustion engine. FIG. 2 is a side longitudinal sectional view thereof and FIG. 3 is a plan view.

Referring to the same Figure, an oil pan 1 comprises an upper oil pan (upper portion) 2 and a lower oil pan (lower portion) 3 which is joined to the bottom portion of this upper oil pan 2 through bolts 4.

The upper oil pan 2 is used as a crank case at the same time and a cylinder block is coupled with the top portion of this upper oil pan 2 through bolts.

The upper oil pan 2 is surrounded by a left side wall 2a, a right side wall 2b, a front side wall 2c and a rear side wall 2d and a flange portion 2e is formed integrally on the outer periphery of the top end thereof. Plural tightening holes 8, 8, 8 are formed at an interval in this flange portion 2e such that they go through and by inserting a bolt in each tightening hole 8, the flange portion 2e can be coupled with a cylinder block (not shown) located above.

A baffle plate 5 is formed integrally on a bottom face of this upper oil pan 2 and a suction portion 5b equipped with an oil strainer 7 is provided substantially in the center of the baffle plate 5. An inclined portion 5c is formed with this suction portion 5b as its vertex so that it is inclined downward toward the left side wall 2a and the right sidewall 2b. Further, the inclined portion 5c is formed such that it is inclined downward toward the front side wall 2c and the rear side wall 2d also and a plurality of oil discharge holes (communicating opening portion) 5a, 5a, 5a are formed in the outer peripheral portion of the inclined portion 5c such that they go through vertically. Consequently, oil dropping on the baffle plate 5 from above can be returned to the oil pan 3 located below through these pluralities of communicating opening portions 5a, 5a, 5a.

The lower oil pan 3 is formed in the shape of a bottomed cup so that oil can be deposited inside. The oil strainer 7 attached to the suction portion 5b is disposed such that it droops so as to be dipped into deposited oil. In the meantime, a filter 7a is provided in the oil strainer 7.

An oil passage 6a is integrally formed in the top face of the baffle plate 5 from the suction portion 5b to the right side wall 2b of the upper oil pan and an oil passage 6b is formed inside the right side wall 2b of the upper oil pan so as to communicate with this oil passage 6a and oil sucked by the oil strainer 7 can be supplied to an oil pump (oil feeding means, not shown) through the oil passages 6a, 6b.

According to this embodiment, a plurality of longitudinal ribs 9, 9, 9 are formed integrally so that they oppose on the inner sides of the left side wall 2a and the right side wall 2b of the upper oil pan 2 and in each longitudinal rib 9, as shown in FIG. 1, the width of its top end side of the upper oil pan is small while the width thereof on the side of the baffle plate 5 is large.

In the meantime, the plurality of longitudinal ribs 9, 9, 9 are formed at the positions of the tightening holes 8, 8, 8 described previously and the longitudinal ribs 9, 9 and the tightening holes 8, 8 are formed so that they are located between respective cylinders 10a, 10b, 10c, 10d at an interval along the arrangement direction of the four cylinders 10a, 10b, 10c, 10d indicated with a phantom line in FIG. 3 and each longitudinal rib 9 is projected inside the upper oil pan 2 so that it intersects the direction of the cylinder row at right angle.

The plurality of communicating opening portions 5a, 5a, 5a formed in the outer periphery of the baffle plate 5 are disposed between the respective longitudinal ribs 9 and 9 formed integrally with the left side wall 2a and the right side wall 2b along the arrangement direction of the cylinders 10a, 10b, 10c, 10d and the communicating opening portions 5a, 5a, 5a are disposed in the back and forth direction also at right angle to the arrangement direction of the cylinders.

According to the above-described structure, because the baffle plate 5 is formed integrally on the bottom portion of the upper oil pan 2, the stiffness of the upper oil pan 2 is intensified. Further, because the plurality of longitudinal ribs 9, 9 are formed integrally on the inner side of the upper oil pan and the bottom end of each longitudinal rib 9 is connected to the baffle plate 5, the stiffness of the upper oil pan 2 is further intensified by the plurality of longitudinal ribs 9, 9. Consequently, vibration and radiating sound can be suppressed excellently and further, because they are formed integrally, the entire weight can be reduced.

Hot oil dropping on the baffle plate 5 from above is introduced by the communicating opening portions 5a, 5a formed on the outer peripheral side and then returned quickly into the lower oil pan 3 through the plurality of communicating opening portions 5a, 5a. Because the returned oil flows on the side wall and the bottom face of the lower oil pan 3, heat is discharged to the atmosphere when it flows down so that oil is cooled excellently and excellently cooled oil is sucked into the oil strainer 7 thereby blocking reduction of lubricating performance and deterioration of oil.

Further, because the plurality of longitudinal ribs 9, 9 are provided, oil dropping on the baffle plate can be introduced to the communicating opening portions 5a, 5a on the outer periphery excellently under a guide of the longitudinal ribs 9, 9.

What is claimed is:

1. An oil pan for internal combustion engine comprising an upper portion to be attached to the bottom portion of a cylinder block directly or through an adaptor plate and a lower portion provided on the bottom of the upper portion, in which a baffle plate is formed integrally downward of said upper portion and an oil supplying means for supplying sucked oil to respective portions of the internal combustion engine is provided, said upper portion comprising side walls connecting said cylinder block with said lower portion and said baffle plate, the baffle plate comprising said sucking portion which is said oil supplying means provided substantially in the center and an inclined portion which is inclined downward toward said side wall with said sucking portion as its vertex, communicating opening portions being formed near said side walls of the inclined portion to communicate said cylinder block with said lower portion, wherein:
a plurality of tightening holes for fastening the oil pan to a cylinder block with tightening means are provided in the top portion of the side wall of said upper portion,
the tightening holes are located between respective cylinders along the arrangement direction of the cylinders formed in the cylinder block, and
longitudinal ribs are formed vertically at positions corresponding to the positions of the tightening holes on the inner side of said side wall while the longitudinal ribs are inclined from the top end of said side wall to said baffle plate.

2. The oil pan for internal combustion engine according to claim 1 wherein said communicating opening portions are provided between said longitudinal ribs in the arrangement direction of the cylinders and on both ends in a direction perpendicular to the arrangement direction of the cylinders.

3. The oil pan for internal combustion engine according to claim 2, wherein an oil passage for introducing oil sucked by a sucking portion of said baffle plate into said oil supplying means is formed integrally in the bottom of the upper portion.

4. The oil pan for internal combustion engine according to claim 1, wherein an oil passage for introducing oil sucked by a sucking portion of said baffle plate into said oil supplying means is formed integrally in the bottom of the upper portion.

5. An oil pan for internal combustion engine comprising an upper portion to be attached to the bottom portion of a cylinder block directly or through an adaptor plate and a lower portion provided on the bottom of the upper portion, in which a baffle plate is formed integrally downward of said upper portion and an oil supplying means for supplying sucked oil to respective portions of the internal combustion engine is provided, said upper portion comprising side walls connecting said cylinder block with said lower portion and said baffle plate, the baffle plate comprising said sucking portion which is said oil supplying means provided substantially in the center and an inclined portion which is inclined downward toward said side wall with said sucking portion as its vertex, communicating opening portions being formed near said side walls of the inclined portion to communicate said cylinder block with said lower portion,
wherein an oil passage for introducing oil sucked by the sucking portion of said baffle plate into said oil supplying means is formed integrally in the bottom of the upper portion.

* * * * *